United States Patent
Boughannam

(10) Patent No.: US 7,783,499 B2
(45) Date of Patent: Aug. 24, 2010

(54) FRAMEWORK FOR DYNAMIC COMPOSITION OF WEB SERVICES

(75) Inventor: Akram Boughannam, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 1991 days.

(21) Appl. No.: 10/755,783

(22) Filed: Jan. 12, 2004

(65) Prior Publication Data

US 2004/0176976 A1   Sep. 9, 2004

Related U.S. Application Data

(63) Continuation-in-part of application No. 10/378,569, filed on Mar. 3, 2003.

(51) Int. Cl.
*G06Q 10/00* (2006.01)

(52) U.S. Cl. ............. 705/1.1; 718/102; 718/106; 709/201; 709/224

(58) Field of Classification Search .......... 705/1, 705/1.1; 718/102, 106; 709/201, 224
See application file for complete search history.

(56) References Cited

U.S. PATENT DOCUMENTS

| | | | |
|---|---|---|---|
| 6,182,136 B1 | 1/2001 | Ramanathan et al. | |
| 6,286,047 B1 | 9/2001 | Ramanathan et al. | |
| 6,336,138 B1 | 1/2002 | Caswell et al. | |
| 6,961,778 B2 * | 11/2005 | Swartz et al. | ............ 709/230 |
| 2002/0010671 A1 | 1/2002 | Tsai | |
| 2002/0032768 A1 | 3/2002 | Voskuil | |
| 2002/0059134 A1 | 5/2002 | Ebbs | |
| 2002/0194076 A1 | 12/2002 | Williams, Jr. et al. | |
| 2003/0018951 A1 | 1/2003 | Srivastava et al. | |
| 2003/0055968 A1 | 3/2003 | Hochmuth et al. | |
| 2003/0061067 A1 | 3/2003 | Atwal et al. | |
| 2003/0061404 A1 | 3/2003 | Atwal et al. | |
| 2003/0110312 A1 | 6/2003 | Gunduc et al. | |

FOREIGN PATENT DOCUMENTS

| | | |
|---|---|---|
| JP | 2002-366353 | 12/2002 |
| WO | WO 0114962 A1 | 3/2001 |

* cited by examiner

*Primary Examiner*—Janice A. Mooneyham
*Assistant Examiner*—Heidi Riviere
(74) *Attorney, Agent, or Firm*—Joseph E. Bracken, Esq.; Steven M. Greenberg, Esq.; Carey, Rodriguez, Greenberg & Paul, LLP

(57) ABSTRACT

A framework for Web services integration can include a Web services integrator having a scheduler coupled to a control. The control can have a coupling to a consumer preferences repository. The scheduler, by comparison, can have couplings both to a state data repository and also to a service activation repository. Finally, the framework can include an interface to the Web service integrator. Notably, an agenda can be disposed within the scheduler. Moreover, a collection of service activation rules can be disposed within the service activation repository. The framework yet further can include a collection of service requestor preferences disposed within the consumer preferences repository. Finally, the framework can include service request state data disposed within the state data repository.

11 Claims, 2 Drawing Sheets

FRAMEWORK FOR DYNAMIC COMPOSITION OF WEB SERVICES

CROSS REFERENCE TO RELATED APPLICATIONS

This patent application is a continuation-in-part of U.S. patent application Ser. No. 10/378,569 entitled WEB SERVICES REGISTRATION FOR DYNAMIC COMPOSITION OF WEB SERVICES filed on Mar. 3, 2003, the entire teachings of which are incorporated herein by reference.

BACKGROUND OF THE INVENTION

1. Statement of the Technical Field

The present invention relates to the field of distributed computing, and more particularly to Web services.

2. Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

In a service-oriented application environment supporting Web services, locating reliable services and integrating those reliable services dynamically in real-time to meet the objectives of an application has proven problematic. While registries, directories and discovery protocols provide a base structure for implementing service detection and service-to-service interconnection logic, registries, directories, and discovery protocols alone are not suitable for distributed interoperability. Rather, a more structured, formalized mechanism can be necessary to facilitate the distribution of Web services in the formation of a unified application.

The rapid growth and adaptation of Web services has introduced new problems which, if not resolved, may render the Web services paradigm impractical and unusable. Specifically, the vision of Web services includes a dynamic electronic marketplace where new Web services can be added dynamically, while other Web services can be removed dynamically. Still, it will be recognized by the skilled artisan that the specific services required by an end user will not always be known a priori. To that end, the electronic marketplace must be able to adapt to the needs of the end user by tailoring marketplace Web services in accordance with dynamically identifiable requirements. In such an environment, the ability to construct and compose new Web services from existing Web services can be essential in order to deliver practical and usable composite services to the end user.

Present approaches to the registration of Web services rely upon UDDI as the sole mechanism. With UDDI, services are described via a service code which remains too general and inadequate for selecting an appropriate service in response to the dynamically specified requirements of service consumers. UDDI further does not allow service providers and service consumers to register services which can be activated and accessed only in selective circumstances. Finally, UDDI remains deficient in that services cannot be grouped together and composed in a manner so as to produce tailored services which may be dynamically requested by service consumers.

SUMMARY OF THE INVENTION

The present invention is a Web services integration framework through which a marketplace for Web services can be maintained. Through the use of the Web services integration framework, composite Web services can be composed from individual Web services so that complex requests for services can be satisfied. As the requirements of the complex requests cannot be known a priori, however, the framework of the present invention can provide a set of conditional rules which specify not only when a Web service can be executed, but also when a Web service cannot be executed.

A framework for Web services integration can include a Web services integrator having a scheduler coupled to a control. The control can have a coupling to a consumer preferences repository. The scheduler, by comparison, can have couplings both to a state data repository and also to a service activation repository. Finally, the framework can include an interface to the Web service integrator. Notably, an agenda can be disposed within the scheduler. Moreover, a collection of service activation rules can be disposed within the service activation repository. The framework yet further can include a collection of service requester preferences disposed within the consumer preferences repository. Finally, the framework can include service request state data disposed within the state data repository.

In a preferred aspect of the invention, control data can be disposed within the control. The control data can guide the control in selecting for execution a particular Web service from among a selection of Web services listed in the agenda. In particular, the control can select a composition of Web services to satisfy the request, even where the control must select from among similar, functionally equivalent Web services. To that end, the framework further can include a reusable script coupled to the control. The script can specify a set of Web services which when combined satisfy a specific service request.

In a marketplace for Web services, a Web services integration method can include the steps of detecting a change to state data for a received service request, and in response to the detection, scheduling at least one service activation rule (SAR) for execution. Once at least one SAR has been scheduled for execution, it can be determined which of the scheduled SARs to execute. As such, the method also can include the step of executing at least one Web service specified by a determined one of the SARs according to the determining step in order to satisfy the received service request.

Notably, the scheduling step can include selecting all SARs whose trigger conditions are satisfied by the detected change. Once selected, the SARs can be placed in an executable agenda. More particularly, responsive to at least one event stored in an event queue, the SARs can be sequentially processed to determine whether an associated trigger event has been satisfied by the state of the marketplace. For each SAR in which an associated trigger event has been satisfied by the state of the marketplace, the SAR can be added to an execution agenda if an associated execution event further has been satisfied by the state of the marketplace.

Importantly, individual ones of the scheduled Web services can be selected based upon a service action specified in said corresponding ones of said SARs. Subsequently, the selected Web services can be executed. In a preferred aspect of the invention, however, a script of the Web services selected for execution according to said determining step can be recorded. In consequence, the script can be invoked subsequently in lieu of the scheduling step in response to a subsequently received identical service request. Similarly, the script can be subsequently invoked in lieu of the scheduling step in response to a subsequently received similar albeit not identical service request.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a framework for Web services integration. The Web services integration framework can provide for the dynamic composition of registered Web services to tailor a specific composite Web service to accommodate the dynamically specified requirements of a Web service consumer. To enable the dynamic composition of registered Web services in the Web services integration framework, Web services can register with the Web services integration framework not only to specify the presence and availability of the Web services, but also to specify when a Web service can be activated, when a Web service can be executed, and when a Web service can be removed from the Web services integration framework.

Figure 1:
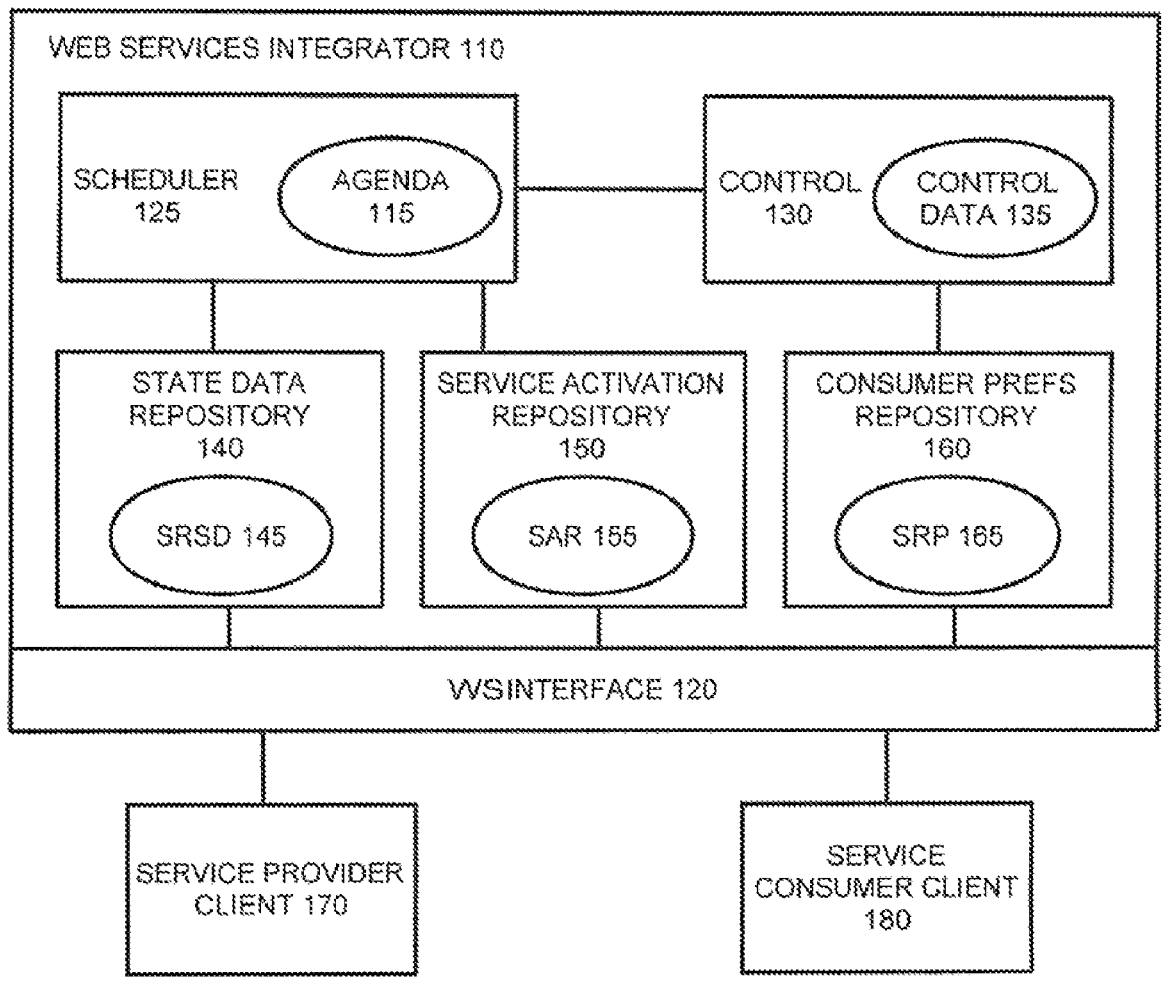
FIG. 1 is a block illustration of a Web services framework in which Web services can be dynamically registered, activated, executed and deactivated in accordance with the present invention; and, FIG. 2 is a flow chart illustrating a process for registering Web services in the Web services framework of FIG. 1 so as to enable the dynamic composition of registered Web services to produce a composite service.

FIG. 1 is a block illustration of a Web services framework in which Web services can be dynamically registered, activated, executed and deactivated in accordance with the present invention. The Web service framework can include a Web services Integrator (WSI) 110 in which individually registered Web services can be combined to produce a composite Web service. Composite Web services can be constructed in order to satisfy complex service requests which cannot be satisfied by any one Web service alone.

The WSI 110 can include a state data repository 140 in which service requests state data 145 can be stored. Service request state data 145 can include workspace state data for each service request for which the WSI 110 processes through the composition of one or more Web services. To that end, the service request state data 145 can include data both required and produced by individual Web services which have been grouped into a composite Web service by the WSI 110. Notably, whenever a change occurs to the service requests state data 145, by virtue of an external service consumer client 180, or by virtue of an internally registered Web service, an event can be considered to have occurred.

The WSI 110 further can include a service activation repository 150 for storing individual service activation rules (SARs) 155. Each SAR 155 can include a service trigger condition, a service execution condition, a service obviation condition, and a service action. Within each SAR 155, the service trigger condition can be a logical expression which describes an event which must occur for the corresponding Web service to become activated. "Activation" as used herein, does not mean "Execution". Rather, activation refers to the placement of the Web service in an active state from which the Web service can be executed when specified conditions are met.

The service execution condition, by comparison, is a logical expression that describes a state which when satisfied, causes the Web service to be scheduled for execution. The service action portion of the SAR 155 can be a description of the result of the execution of the Web service. Finally, the service obviation condition describes a state which when encountered will cause the Web service to be removed from the list of services eligible for execution. Thus, when conditions indicate that a Web service need not remain in an active state, the Web service can be removed from the activated state through the satisfaction of the service obviation condition.

Importantly, the WSI 110 can include both a scheduler 125 and a control 130. The scheduler 125 can schedule the execution of individually registered Web services registered in an agenda 115 of Web services. The control 130, by comparison, can include control data 135 which can specify which Web services in the agenda 115 will be required to be executed to produce a suitable composite Web service able to satisfy the requirements of the service consumer client 180. More particularly, the control 130 can select individual Web services for execution based upon both the service action component of the SAR 155 for each Web service, and also the service requester preferences 165 stored in a consumer preferences repository 160.

In a basic implementation of the invention, the control 130 can invoke individual Web services for execution based upon an ordering of the Web services in a list of Web services scheduled for execution in the agenda 115. In a preferred aspect of the invention, the control 130 can intelligently invoke specific Web services for execution based upon the preferences of the service requestor specified in the service requestor preferences 165. In particular, to the extent that two Web services are equivalently equipped to handle a complex service request, the service requestor preferences 165 can indicate whether a preference can be identified among the equivalently equipped Web services.

In operation, a service provider client 170 can register with a Web service with the WSI 110 through the WSI interface 120. In particular, the Web service can register by providing to the WSI interface 120 associated SAR 155 for the particular Web service. Once the SAR 155 has been added to the service activation repository 150 of the WSI 110, a service consumer client 180, or an activated Web service can change elements of the service request state data 145 in the state data repository 140 through the WSI interface 120. Any change to the service request state data 145 can cause the posting of an event to an event queue (not shown) in the scheduler 125.

Responsive to an event which has been posted in the queue, the scheduler 125 can select individual Web services for execution. Specifically, all Web services having a SAR 155 whose trigger conditions can be satisfied can be selected for further consideration. Subsequently, all triggered ones of the Web services whose corresponding SARs 155 include service activation rules which can be satisfied based upon a current state in the state data repository 140 can be placed on the execution agenda 115. Similarly, where the service obviation conditions for any one Web service having a SAR 155 in the agenda 115 can be met, the SAR 155 associated with that Web service can be removed from the agenda 115.

Figure 2:
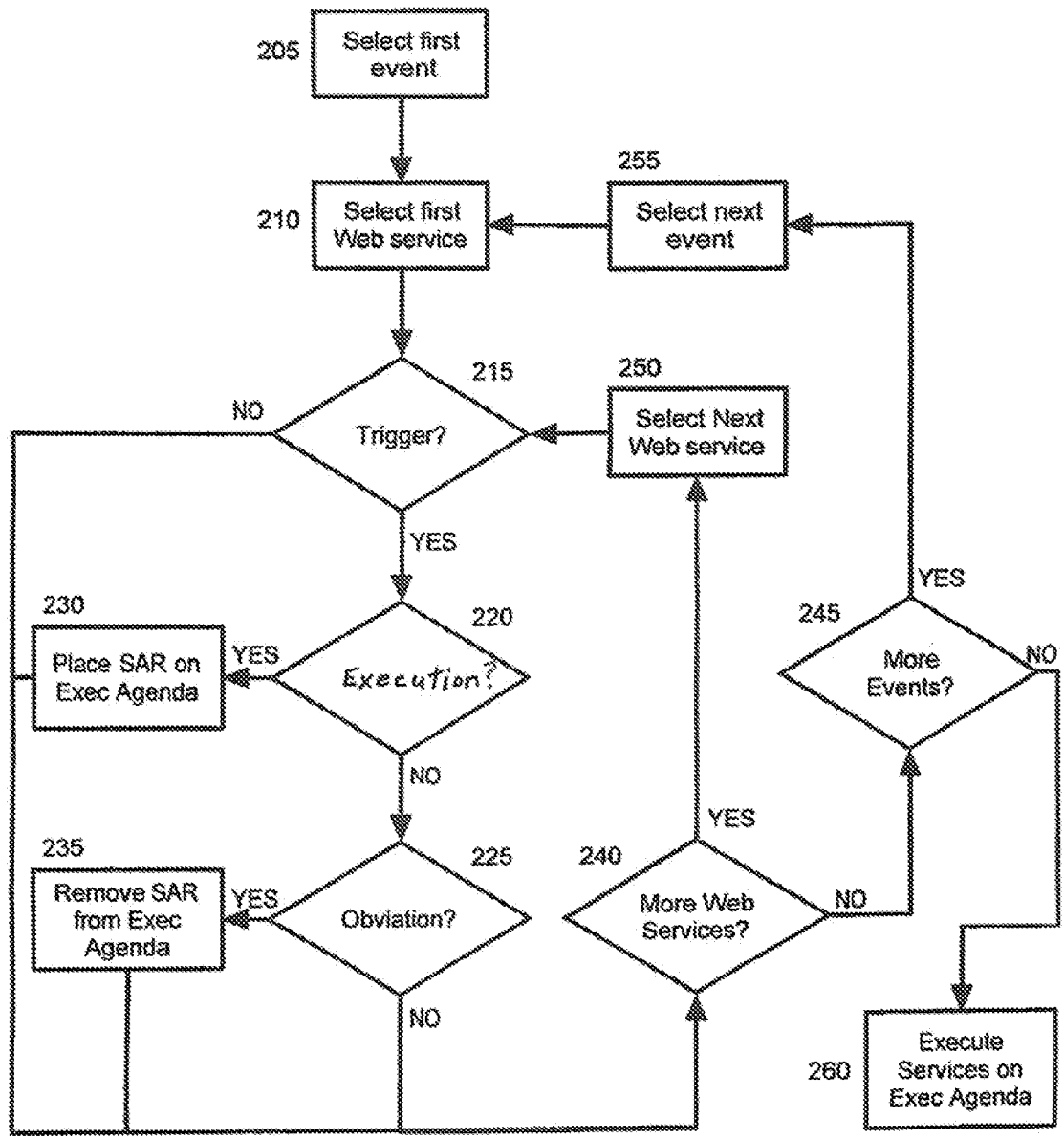

FIG. 2 is a flow chart illustrating a process for managing Web services in the WSI 110 of FIG. 1. Beginning in block 205, a first event in the event queue can be selected. In block 210, a SAR for a first Web service can be considered. In decision block 215, if the service trigger condition for the SAR cannot be satisfied based upon the current state, and further if in decision block 240 additional SARs remain to be considered for the event, in block 250, the SAR for the next Web service registered in the framework can be considered. Otherwise, the process can continue through decision block 220.

In decision block 220, it can be determined whether the service execution condition for the SAR can be met. If so, in block 230 the SAR can be added to the execution agenda. If not, in block 225, it can be determined whether the service obviation condition for the SAR can be met. If so, in block 235 the SAR can be removed from the execution agenda. In either case, in decision block 240, it can be determined if other SARs remain to be considered for the event. If so, the next SAR can be selected in block 250 and the process can repeat. Otherwise, in decision block 245 it can be determined whether other events remain to be processed in the event queue. If so, the next event can be selected in block 255 and the process can repeat through block 210.

In decision block 245, if no further events remain in the event queue, in block 260, the scheduler can execute the services listed in the execution agenda. In particular, through consultation with the control element of the WSI, the SAR can execute each scheduled service, while collecting the results of the execution as the case may be. In this way, the effect of a composite Web service can be simulated through the sequential execution of multiple granular Web services which have registered with the WSI.

Notably, once a complex service request has been satisfied by a set of Web services invoked in a specified sequence, the WSI can save the specified sequence in a script. Subsequently, the script can be invoked in response to a similar or identical albeit subsequently issued service request presented in the WSI. Consequently, the WSI can rely upon the script without first having to schedule one or more Web services to respond to the request. Still, it can remain the task of the WSI to ensure the activation of the scripted Web services such that the scripted Web services in combination can aptly respond to the request.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. In a marketplace for Web services, a computer-implemented Web services integration method, the method comprising the steps of:
    detecting a change to state data for a received service request, wherein state data comprises information required or produced by a Web service;
    responsive to said detection, scheduling at least one service activation rule (SAR) for execution, wherein a SAR defines when at least one Web service is executed and an action performed by the at least one Web service;
    determining which of said scheduled SARs to execute in order to satisfy said service request; and
    executing at least one Web service specified by a determined one of said SARs according to said determining step in order to satisfy said received service request.

2. A computer-readable tangible medium having stored thereon computer-readable instructions for Web services integration in a marketplace for Web services, the computer-readable instructions for causing a computer system to perform the steps of:
    detecting a change to state data for a received service request, wherein state data comprises information required or produced by a Web service;
    responsive to said detection, scheduling at least one service activation rules (SAR) for execution, wherein a SAR defines when at least one Web service is executed and an action performed by the at least one Web service;
    determining which of said scheduled SARs to execute in order to satisfy said service request; and
    executing at least one Web service specified by a determined one of said SARs according to said determining step in order to satisfy said received service request.

3. The method of claim 1, wherein said scheduling step comprises the steps of:
    selecting all SARs whose trigger conditions are satisfied by said detected change; and,
    placing said selected SARs in an executable agenda.

4. The method of claim 1, wherein said scheduling step comprises the steps of:
- responsive to at least one event stored in an event queue, sequentially processing said SARs to determine whether an associated trigger event has been satisfied by the state of the marketplace; and,
- for each SAR in which an associated trigger event has been satisfied by the state of the marketplace, adding said SAR to an execution agenda if an associated execution event further has been satisfied by the state of the marketplace.

5. The method of claim 1, further comprising the steps of:
- selecting individual ones of said scheduled Web services based upon a service action specified in said corresponding ones of said SARs; and,
- executing said selected Web services.

6. The method of claim 1, further comprising the steps of:
- recording a script of said at least one Web service selected for execution according to said determining step; and,
- invoking said script in lieu of said scheduling step in response to a subsequently received identical service request.

7. The method of claim 1, further comprising the steps of:
- recording a script of said at least one Web service selected for execution according to said determining step; and,
- invoking said script in lieu of said scheduling step in response to a subsequently received similar service request.

8. The computer-readable tangible medium of claim 2, wherein said scheduling step comprises the steps of:
- selecting all SARs whose trigger conditions are satisfied by said detected change; and,
- placing said selected SARs in an executable agenda.

9. The computer-readable tangible medium of claim 2, wherein said scheduling step comprises the steps of:
- responsive to at least one event stored in an event queue, sequentially processing said SARs to determine whether an associated trigger event has been satisfied by the state of the marketplace; and,
- for each SAR in which an associated trigger event has been satisfied by the state of the marketplace, adding said SAR to an execution agenda if an associated execution event further has been satisfied by the state of the marketplace.

10. The computer-readable tangible medium of claim 2, further comprising the steps of:
- selecting individual ones of said scheduled Web services based upon a service action specified in said corresponding ones of said SARs; and,
- executing said selected Web services.

11. The computer-readable tangible medium of claim 2, further comprising the steps of:
- recording a script of said at least one Web service selected for execution according to said determining step; and,
- invoking said script in lieu of said scheduling step in response to a subsequently received identical service request.

* * * * *